(12) United States Patent
zur Loye (10) Patent No.: US 9,074,549 B1
(45) Date of Patent: Jul. 7, 2015

(54) AFTERTREATMENT THERMAL MANAGEMENT STRATEGIES FOR INTERNAL COMBUSTION ENGINES HAVING MULTIPLE CYLINDER BANKS

(71) Applicant: Cummins Inc., Columbus, IN (US)

(72) Inventor: Axel Otto zur Loye, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/223,325

(22) Filed: Mar. 24, 2014

(51) Int. Cl.
*F02D 41/00* (2006.01)
*F02D 41/30* (2006.01)
*F02D 41/02* (2006.01)
*F02D 41/40* (2006.01)
*F02M 25/07* (2006.01)
*F01N 3/00* (2006.01)
*F01N 3/035* (2006.01)

(52) U.S. Cl.
CPC .............. *F02D 41/30* (2013.01); *F02D 41/025* (2013.01); *F02D 41/029* (2013.01); *F02D 41/405* (2013.01); *F02D 2041/0022* (2013.01); *F02M 25/0727* (2013.01); *F02M 25/0707* (2013.01); *F01N 3/035* (2013.01)

(58) Field of Classification Search
CPC ... F02D 41/025; F02D 41/029; F02D 41/405; F02D 2041/0022; F02M 25/0707; F02M 25/0713; F02M 25/0727; F01N 3/035; F01N 3/0235
See application file for complete search history.

(56) References Cited

U.S. PATENT DOCUMENTS

| | | |
|---|---|---|
| 6,164,065 A | 12/2000 | Denari et al. |
| 6,938,410 B2 | 9/2005 | Glugla et al. |
| 7,854,114 B2 | 12/2010 | England |
| 7,856,815 B2 | 12/2010 | Demura et al. |
| 7,934,487 B2 | 5/2011 | Santoso et al. |
| 8,256,214 B2 | 9/2012 | Rioli et al. |
| 8,857,158 B2 * | 10/2014 | Masuda et al. .................. 60/285 |

* cited by examiner

*Primary Examiner* — Hieu T Vo
(74) *Attorney, Agent, or Firm* — Taft Stettinius & Hollister LLP (57) ABSTRACT

The present disclosure relates to engines with multiple cylinder banks and associated exhaust aftertreatment systems. Systems and methods are disclosed that relate to engine operations involving fuelling and throttle control for thermal management of the aftertreatment system of one cylinder bank while the other cylinder bank or banks are fuelled to satisfy a portion of the torque request to the engine that is not satisfied by the thermally managed cylinder bank.

28 Claims, 4 Drawing Sheets

AFTERTREATMENT THERMAL MANAGEMENT STRATEGIES FOR INTERNAL COMBUSTION ENGINES HAVING MULTIPLE CYLINDER BANKS

BACKGROUND

The present invention relates to engines with multiple cylinder banks and associated exhaust aftertreatment systems, and more particularly, but not exclusively, relates to engine operations using cylinder bank fuelling and throttle control for thermal management of the multiple exhaust aftertreatment systems.

Various aftertreatment subsystems have been developed to control exhaust emissions from internal combustion engines. The performance of aftertreatment subsystems often varies with temperature, which has led to the development of various thermal management schemes. An exhaust throttle can be used to increase exhaust gas temperatures. However, the throttle position must be carefully adjusted as operating conditions, such as engine speed, engine load, and ambient conditions, are varied. This requires sophisticated controls and a full authority throttle. Fully authority throttles are expensive and complicated, require a high precision and high torque actuator, and are prone to failure in the extreme exhaust conditions environment. Therefore, further improvements in this technology area are needed.

SUMMARY

There is disclosed in the present application various aspects of unique systems, methods, devices and apparatus to thermally manage an exhaust aftertreatment system during operation of an internal combustion engine. In one aspect, there is disclosed an internal combustion engine system including two or more cylinder banks connected to respective aftertreatment systems. An on-off type throttle is associated with each cylinder bank and each throttle is operable in conjunction with fuelling of the respective cylinder bank to either regulate the temperature of the associated aftertreatment system to a target temperature condition in response to a thermal management event, or to fuel the cylinder bank and control the associated throttle to satisfy a portion of the engine torque request not satisfied by the thermally managed cylinder bank.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF REPRESENTATIVE EMBODIMENTS

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

Figure 1:
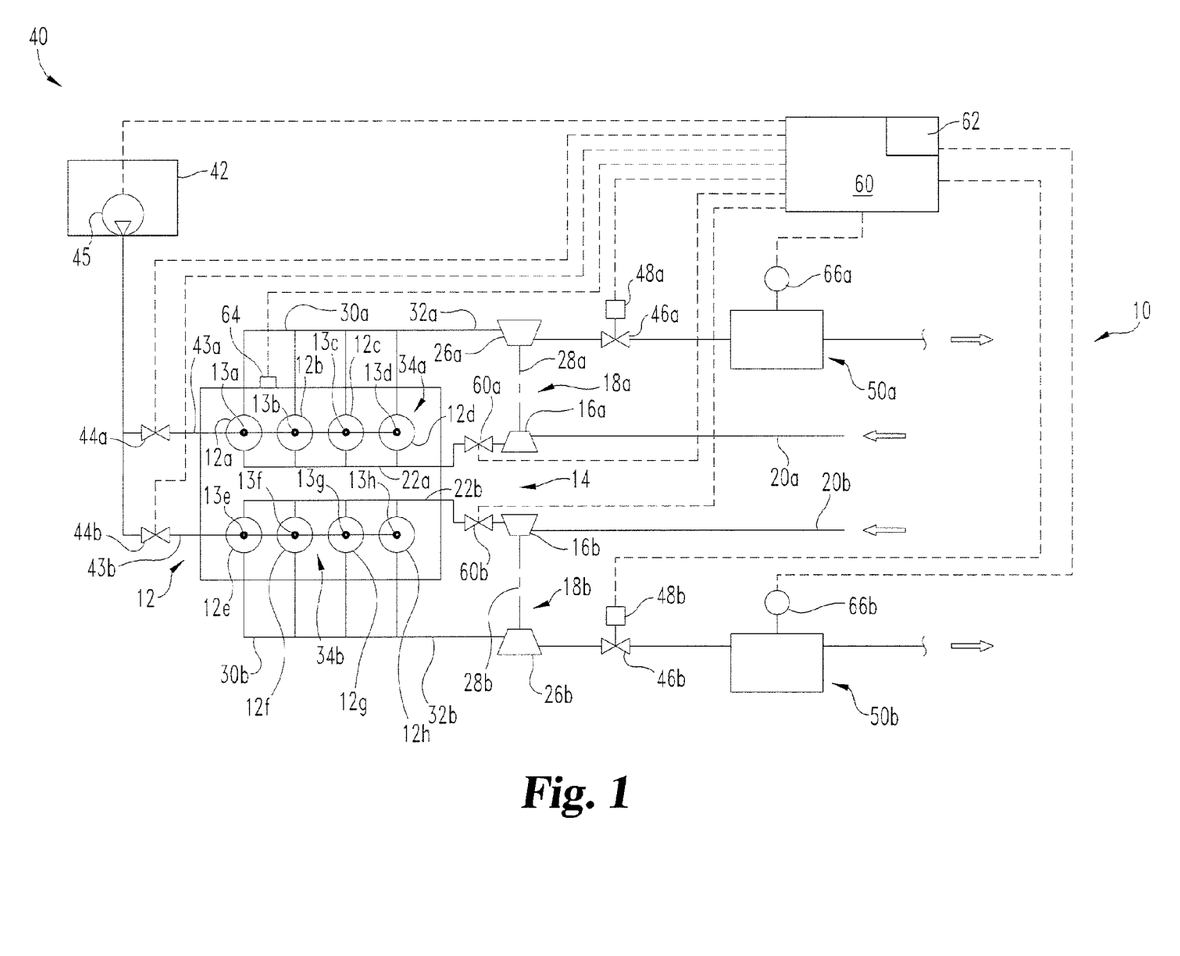
FIG. 1 is a schematic view of a system that includes an internal combustion engine with multiple cylinder banks each connected with a separate intake system and exhaust system having at least one throttle and an aftertreatment system.

FIG. 1 shows an internal combustion engine system 10 according to one embodiment of the present application. System 10 includes an internal combustion engine 12 having an intake system 14 and an exhaust system 36. Engine 12 can be any type of engine, and in one specific embodiment is a diesel engine that includes a number of cylinders housing a number of pistons and combusts a fuel provided to each of the cylinders to produce an exhaust gas from each of the cylinders. In the illustrated embodiment, engine 12 includes first and second cylinder banks 34a, 34b each connected with its own respective exhaust aftertreatment system via an exhaust flow path. Engine 12 can be V-type engine with two cylinder banks, although other embodiments include in-line cylinder arrangements, a W-type engine, or any engine arrangement with more than cylinder with at least two subsets of cylinders each connected to its own aftertreatment system.

In the illustrated embodiment, engine 12 includes a first intake manifold 22a fluidly coupled to an outlet of a first compressor 16a of a first turbocharger 18a fluidly coupled with a first intake conduit 20a, and a second intake manifold 22b fluidly coupled to an outlet of a second compressor 16b of a second turbocharger 18b fluidly coupled with a second intake conduit 20b. Compressor 16a includes a compressor inlet coupled to first intake conduit 20a for receiving fresh air from an air inlet (not shown) and compressor 16b includes a compressor inlet coupled to second intake conduit 20b for receiving fresh air from an air inlet. Intake conduits 20a, 20b can have separate inlets or can combine to receive air from a common inlet. System 10 may also include intake throttles 60a, 60b of known construction disposed in line with respective ones of the intake conduits 20a, 20b between compressors 16a, 16b and intake manifolds 22a, 22b. Optionally, system 10 may include an intake air cooler (not shown) of known construction disposed in line with each of the intake conduits 20a, 20b between compressor 16a, 16b and intake manifold 14a, 14b.

Each of the turbocharger compressors 16a, 16b is mechanically coupled to a respective one of the turbocharger turbines 26a, 26b via a corresponding drive shaft 28a, 28b. Turbine 26a includes a turbine inlet fluidly coupled to an exhaust manifold 30a of engine 12 via an exhaust conduit 32a, and turbine 26b includes a turbine inlet fluidly coupled to an exhaust manifold 30b of engine 12 via an exhaust conduit 32b. Collectively, conduit 20a, intake manifold 22a, first cylinder bank 34a, exhaust manifold 30a, and exhaust conduit 32a define a first pathway along which gas flows from compressor 16a to turbine 26a during nominal operation of first cylinder bank 34a of engine 12. Collectively, conduit 20b, intake manifold 22b, cylinder bank 34b, exhaust manifold 30b, and exhaust conduit 32b define a first pathway along which gas flows from compressor 16b to turbine 26b during nominal operation of second cylinder bank 34b of engine 12.

For the depicted embodiment, engine 12 is of a reciprocating piston type with four stroke operation, and runs on diesel fuel received by direct or port injection with compression ignition. More specifically, as schematically represented in FIG. 1, engine 12 includes, for purposes of illustration and not limitation, eight pistons (not shown) that are disposed in cylinders 12a-12h, respectively. The pistons are each connected to a crankshaft by a corresponding connecting rod (not shown) to reciprocally move within the respective cylinder 12a-12h in a standard manner for four stroke engine operation. Each cylinder 12a-12h includes a combustion chamber with appropriate intake and exhaust valves (not shown) that are opened and closed via a camshaft (not shown) and fuel injectors 13a-13h, respectively. Fuel injectors 13a-13h are of a standard type that operate in response to signals from electronic controls described in greater detail hereinafter.

Fuel injectors 13a-13h receive fuel from a fuel system 40 that includes a fuel source 42 in fluid communication therewith. Fuel source 42 can be connected with a fuel pump 45 that provides a flow of fuel to cylinders 12a-12h in response to a fuelling command from a controller 60. Fuel injectors 13a-13h can be direct injectors as shown, port injectors, or both. Alternatively or additionally, fuel can be provided at any suitable location along intake system 14, and more than one fuel source can be provided for embodiments of engine 12 that provide for dual fuel operations. In the illustrated embodiment, cylinders 12a-12d of cylinder bank 34a can receive fuel from a first common rail 43a and cylinders 12e-12h can receive fuel from a second common rail 43b. Separate fuel control valves 44a, 44b can be provided for each of the cylinders banks 34a, 34b so that the fuelling can be controlled separately to each cylinder bank 34a, 34b via a cylinder bank fuelling command from controller 60. Alternatively or additionally, each of the injectors 13a-13h can be separately controlled via fuelling commands from controller 60 to selectively admit fuel to the respective cylinder 12a-12h. In addition, each of the cylinders 12a-12h may be connected to a same common rail, or a common rail is omitted altogether.

Figure 2A:
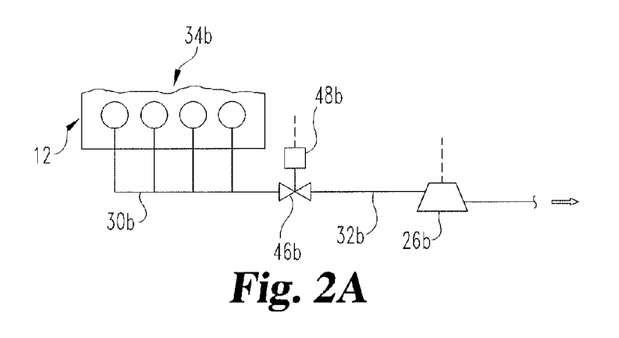
FIGS. 2A and 2B are schematics of alternative embodiments of exhaust throttle arrangements in the exhaust system.

System 10 further includes a first exhaust throttle 46a in exhaust conduit 32a downstream of turbine 26a, and a second exhaust throttle 46b in exhaust conduit 32b downstream of turbine 26b. In the illustrated embodiment, exhaust throttles 46a, 46b are downstream of the respective turbine 26a, 26b. Alternatively, as shown in FIG. 2A, the exhaust throttle can be upstream of the turbine, such shown with respect to exhaust throttle 46b and turbine 26b. In another embodiment, a multi-stage turbocharger is provided and the exhaust throttle is located between the turbines of the turbine stages, such as shown with exhaust throttle 46b and turbines 26b, 26b' in FIG. 2B.

First exhaust throttle 46a and second exhaust throttle 46b each include an actuator 48a, 48b, respectively, that are operably connected to controller 60 to receive control signals that actuate exhaust throttles 46a, 46b between on-off or open-closed positions in response to operating parameters of engine 12 and the exhaust system 36 to provide thermal management of the corresponding aftertreatment systems 50a, 50b connected to the respective exhaust conduit 32a, 32b. Exhaust throttles 46a, 46b can include any suitable valve member in the exhaust flow path that is actuatable between two positions, such as an open/on position, and a closed/off position. The valve members of exhaust throttles 46a, 46b can be, for example, a butterfly type valve, a guillotine-type valve, or a ball-type valve. In one embodiment, the flow restricting portion of the valve includes a passage so that when the valve is closed or off, a minimum exhaust flow is permitted to pass therethrough that is set at a targeted low load condition of engine 12. Actuators 48a, 48b can be an electronic actuator, an electric motor, a pneumatic actuator, or any other suitable type of actuator to operate the valve member of the respective exhaust throttle 46a, 46b. In another embodiment, intake throttles 60a, 60b can include actuators that are operably connected to controller 60 to receive control signals that actuate the intake throttles 60a, 60b between on-off or open-closed positions in response to operating parameters of engine 12 and the exhaust system 36 to provide thermal management of the corresponding aftertreatment systems 50a, 50b connected to the respective exhaust conduit 32a, 32b.

Each aftertreatment system 50a, 50b can include a number of devices in its respective exhaust flow path to chemically convert and/or remove undesirable constituents from the exhaust stream before discharge into the environment. Referring to FIG. 2C, in one specific embodiment, one or both of exhaust aftertreatment systems 50a, 50b may include an oxidation catalyst 70 which is in fluid communication with exhaust flow path via exhaust conduit 32a, 32b and is operable to catalyze oxidation of one or more compounds in the exhaust flowing through the exhaust flow path such as, for example, oxidation of unburned hydrocarbons or oxidation of NO to $NO_2$. In another embodiment, exhaust aftertreatment systems 50a, 50b may further include a diesel particulate filter 72 in fluid communication with the exhaust flow path and operable to reduce the level of particulates in exhaust flowing through exhaust conduit 32a, 32b.

Exhaust aftertreatment system 50a, 50b may include a reductant injector 78 and an SCR catalyst 80. Reductant injector 78 is supplied with reductant from a reductant reservoir 82 and is operable to inject reductant into the exhaust gas in exhaust conduit 32a, 32b. In an exemplary embodiment the reductant is an aqueous solution of urea which decomposes to provide ammonia. Other embodiments utilize different reductants, for example, aqueous solutions of ammonia, anhydrous ammonia, or other reductants suitable for SCR treatment. Reductant injected into exhaust flow path is provided to SCR catalyst 80 which is in flow communication with exhaust conduit 32a, 32b and is operable to catalyze the reduction of $NO_x$. The SCR catalyst 80 can be of any type of SCR catalyst known in the art. Exhaust aftertreatment system 50a, 50b may further include a hydrocarbon (HC) injector 84 which is supplied with HC from an HC reservoir such as fuel source 42 or a secondary source (not shown) and is operationally coupled to the exhaust stream at a position upstream of oxidation catalyst 70. Other embodiments contemplate HC injector 84 is omitted and hydrocarbons are added by the fuel system or any other suitable means known in the art, such as by late post-combustion fuel injection into one or more of the cylinders 12a-12h.

Figure 2B:
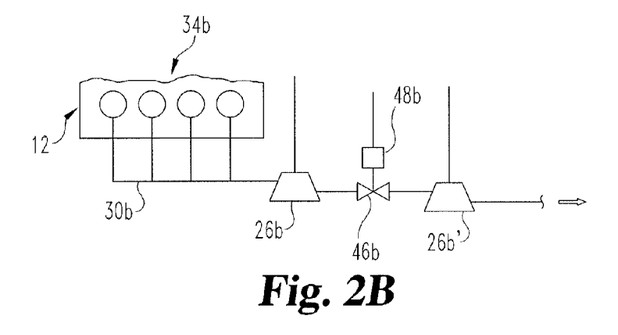
Figure 2C:
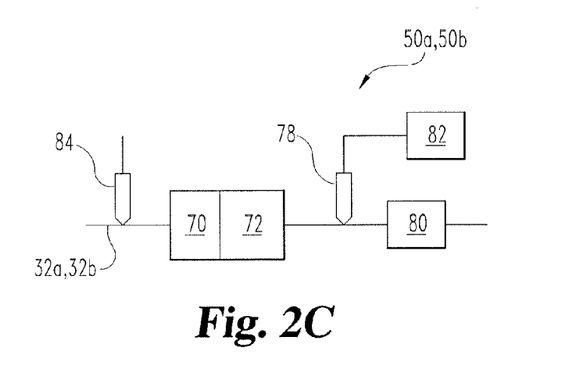
FIG. 2C is a schematic of an example aftertreatment system.

The exhaust flow path illustrated schematically in FIGS. 1-2C, may be provided in a variety of physical configurations and the order of the aftertreatment components could be changed. For example, the particulate filter 72 could be provided downstream from SCR catalyst 80. In an exemplary embodiment an exhaust flow path proceeds from the output of a turbocharger of an engine through a conduit to a structure containing an oxidation catalyst 70 and a diesel particulate filter 72, through a second conduit to a structure containing an SCR catalyst 80 and through another conduit which outlets to the ambient environment. Embodiments may also include an ammonia oxidation (AMOX) catalyst (not shown) at a position downstream of the SCR catalyst 80, which is operable to catalyze the reaction of NH$_3$ which slips past the SCR catalyst.

The reactions that take place in an ammonia based aftertreatment system 50a, 50b are in part temperature dependent. An effective temperature range for an ammonia based SCR system depends on the various fuels, gas constituents, NO:NO$_2$ ratio, catalyst composition and catalyst geometry of the system. Operating outside of the temperature range for these reactions may reduce efficiency of any one or multiple reactions thereby reducing the efficiency of the system. A less efficient system may result in an unacceptable level of various components in the exhaust. In addition, one or more components of the aftertreatment systems 50a, 50b may require periodic regeneration, which requires exhaust temperatures at the upper end of or above nominal exhaust system operating temperatures, to remove contaminants and restore performance. The systems and methods disclosed herein provide for effective and efficient thermal management of aftertreatment systems 50a, 50b to operate at a target temperature condition, and therefore lessen emissions impact of the system when temperature excursions occur below certain temperature thresholds and/or temperature increases are needed to respond to a thermal management event.

System 10 includes controller 60 that is generally operable to control and manage operational aspects of engine 12, fuel system 40, exhaust throttles 46a, 46b, and/or intake throttles 60a, 60b. Controller 60 includes a memory 62 as well as a number of inputs and outputs for interfacing with various sensors, actuators and other components coupled to engine 12, fuel system 40, exhaust throttles 46a, 46b, intake throttles 60a, 60b, and aftertreatment systems 50a, 50b. Controller 60 can be an electronic circuit device comprised of one or more components, including digital circuitry, analog circuitry, or both. Controller 60 may be of a software and/or firmware programmable type; a hardwired, dedicated state machine; or a combination of these. In one embodiment, controller 60 is of a programmable microcontroller solid-state integrated circuit type that includes memory 62 and one or more central processing units. Memory 62 can be comprised of one or more components and can be of any volatile or nonvolatile type, including the solid-state variety, the optical media variety, the magnetic variety, a combination of these, or such different arrangement as would occur to those skilled in the art. Controller 60 can include signal conditioners, signal format converters (such as analog-to-digital and digital-to-analog converters), limiters, clamps, filters, and the like as needed to perform various control and regulation operations described herein. Controller 60, in one embodiment, may be a standard type sometimes referred to as an electronic or engine control module (ECM), electronic or engine control unit (ECU) or the like, that is directed to the regulation and control of overall engine operations. Alternatively, controller 60 may be dedicated to control of just the operations described herein or to a subset of controlled aspects of system 10. In any case, controller 60 preferably includes one or more control algorithms defined by operating logic in the form of software instructions, hardware instructions, dedicated hardware, or the like. These algorithms will be described in greater detail hereinafter, for controlling operation of various aspects of system 10.

Controller 60 includes a number of inputs for receiving signals from various sensors or sensing systems associated with elements of system 10. While various sensor and sensor inputs are discussed herein, it should be understood that other sensor and sensor inputs are possible. Furthermore, one or more sensors and sensor inputs discussed herein may not be required. The operative interconnections of controller 60 and elements of system 10 may be implemented in a variety of forms, for example, through input/output interfaces coupled via wiring harnesses, a datalink, a hardwire or wireless network and/or a lookup from a memory location. In other instances all or a portion of the operative interconnection between controller 60 and an element of system 10 may be virtual. For example, a virtual input indicative of an operating parameter may be provided by a model implemented by controller 60 or by another controller which models an operating parameter based upon other information.

System 10 includes an engine speed sensor 64 electrically connected to an engine speed input of controller 60 via a signal path. Engine speed sensor 64 is operable to sense rotational speed of the engine 12 and produce an engine speed signal on the signal path indicative of engine rotational speed. In one embodiment, sensor 64 is a Hall effect sensor operable to determine engine speed by sensing passage thereby of a number of equi-angularly spaced teeth formed on a gear or tone wheel. Alternatively, engine speed sensor 64 may be any other known sensor operable as just described including, but not limited to, a variable reductance sensor or the like. In certain embodiments, system 10 includes an engine position sensor (not shown) that detects a current position of the crankshaft.

System 10 may further include various sensors not shown, such as intake manifold temperature sensors disposed in fluid communication with the intake manifolds 22a, 22b of engine 12. Intake manifold temperature sensors may be of known construction, and operable to produce a temperature signal indicative of the temperature of air charge flowing into the intake manifolds 22a, 22b. System 10 may further include an intake manifold pressure sensor disposed in fluid communication with intake manifolds 22a, 22b operable to produce a pressure signal indicative of air pressure within intake manifold 22a, 22b. System 10 may also include exhaust manifold pressure sensors disposed in fluid communication with exhaust manifolds 30a, 30b that are operable to produce pressure signal indicative of gas pressure within exhaust manifolds 30a, 30b.

Other control mechanisms included within system 10 include electronically controllable flow control valves 44a, 44b and/or fuel pump 45 of fuel system 40. Controller 60 is operable to control flow control valves 44a, 44b, and/or fuel pump 45, and/or injectors 13a-13h, to control the amount and timing of fuel to cylinders 12a-12h and/or to cylinder banks 34a, 34b. Furthermore, controller 60 can direct the withholding of fuel from one or more of cylinders 12a-12h for a desired period of time. As discussed further below, controller 60 is operable to differentially fuel cylinder banks 34a, 34b to satisfy a torque request to engine 12 while producing an exhaust gas flow that provides desired thermal management conditions from one of the cylinder banks 34a, 34b for thermal management of its respective aftertreatment system 50a, 50b.

Controller 60 is further connected to one or more sensors 66a, 66b of aftertreatment systems 50a, 50b to receive signals indicative of operating parameters of the aftertreatment systems 50a, 50b. An example operating parameter includes a temperature of the exhaust gas and/or one or more components of aftertreatment systems 50a, 50b. Another example operating parameter includes one or more exhaust gas constituents at any one or more locations along aftertreatment system 50a, 50b or in exhaust conduit 32a, 32b. Example exhaust gas constituents include NOx, NO, NO2, and/or NH3 added by a reductant injection system 78, 82 in response to reductant injection commands from controller 60. Controller

60 is further operable to produce an exhaust throttle control signal to control the position of the exhaust throttles 46a, 46b and/or intake throttles 60a, 60b between on-off or open-closed positions. The positions of the exhaust throttles 46a, 46b and/or intake throttles 60a, 60b change a flow rate of exhaust gas into the respective aftertreatment system 50a, 50b and thus, in certain operating conditions, can be manipulated to control the temperature of the exhaust gas exiting the respective cylinder banks 34a, 34b. Therefore, the pressure drop across one of the respective cylinder banks 34a, 34b can be controlled to, as discussed further below, increase the operating temperature of the respective aftertreatment system 50a, 50b by closing the respective exhaust throttle 46a, 46b and/or intake throttles 60a, 60b to respond to thermal management requirements for one aftertreatment system while cylinder banks 34a, 34b are differentially fuelled to produce a target temperature condition in the thermally managed aftertreatment system and to satisfy the torque request from the operator.

For a nominal combustion mode of operation of cylinders 12a-12h, exhaust throttles 46a, 46b are both open and controller 60 determines an appropriate amount of fueling to each cylinder bank 34a, 34b as a function of the engine speed signal from engine speed sensor 64 as well as one or more other parameters such as a torque request; and generates corresponding fueling command output signals, with appropriate timing relative to ignition, using techniques known to those skilled in the art. For operations in a thermal management mode, controller 60 may also determine an appropriate timing and duration for opening and closing of exhaust valves of cylinders 12a-12d and/or 12e-12h to increase exhaust temperature and aftertreatment system efficiency to obtain a desired target temperature condition for the respective aftertreatment system 50a, 50b. Controller 60 also executes logic in the thermal management mode to regulate various other aspects of engine operation based on the various sensor inputs available, and to generate corresponding control signals with outputs to control the fuelling amount with fuelling system 40 and timing and the opening and closing of exhaust throttles 46a, 46b via actuators 48a, 48b and/or intake throttles 60a, 60b to thermally manage aftertreatment systems 50a, 50b while satisfying a torque request to engine 12.

System 10 includes aftertreatment systems 50a, 50b to provide for aftertreatment of exhaust gases before discharge through a tailpipe. As discussed further below, the techniques and systems described herein allow for operation of system 10 in a thermal management mode to increase the efficiency of aftertreatment systems 50a, 50b in response to, for example, a request for regeneration of an aftertreatment component, a request for a HC desorb, a request for reductant deposit removal, a request for an increase in temperature in response to a cold start, low load, low temperature, and/or any other condition or conditions where thermal management of aftertreatment systems 50a, 50b is desired. In the discussion that follows, specific reference is made to exhaust throttles 46a, 46b, it being understood that intake throttles 60a, 60b could be operated instead and in a similar manner to produce the desired results.

Under a first low load condition, one of the exhaust throttles 46a, 46b is closed via its actuator 48a, 48b and its cylinder bank 34a, 34b is fuelled to thermally manage the temperature of its respective aftertreatment system 50a, 50b to obtain a target temperature condition while the other exhaust throttle 46a, 46b remains open and its cylinder bank 34a, 34b is fuelled to satisfy the portion of a torque request not satisfied by the thermally managed cylinder bank. Under a second low load condition in which the cylinder bank 34a, 34b having an open exhaust throttle 46a, 46b requires a low fuelling amount to satisfy the torque request, its exhaust throttle can also be closed to further increase the engine load and exhaust temperatures. Upon detection of a low fuelling amount for the non-thermally managed cylinder bank, the thermally managed cylinder bank 34a, 34b having the already closed exhaust throttle is fuelled to satisfy the torque request, and then after closure of the second exhaust throttle 46a, 46b the thermally managed cylinder bank 34a, 34b resumes thermal management fuelling operations to achieve or maintain the target temperature condition while the other cylinder bank is fuelled to satisfy the torque request not satisfied by the thermally managed cylinder bank.

Under high load conditions in which closing of an exhaust throttle 46a, 46b would prevent satisfaction of the torque request, the exhaust throttles 46a, 46b both remain open and one cylinder bank 34a, 34b is fuelled for thermal management of its aftertreatment system 50a, 50b and the other cylinder bank 34a, 34b is fuelled to satisfy the torque request. Accordingly, thermal management of the aftertreatment systems 50a, 50b is provided for all load conditions while satisfying the torque request employing on-off type exhaust throttles 46a, 46b.

Figure 3:
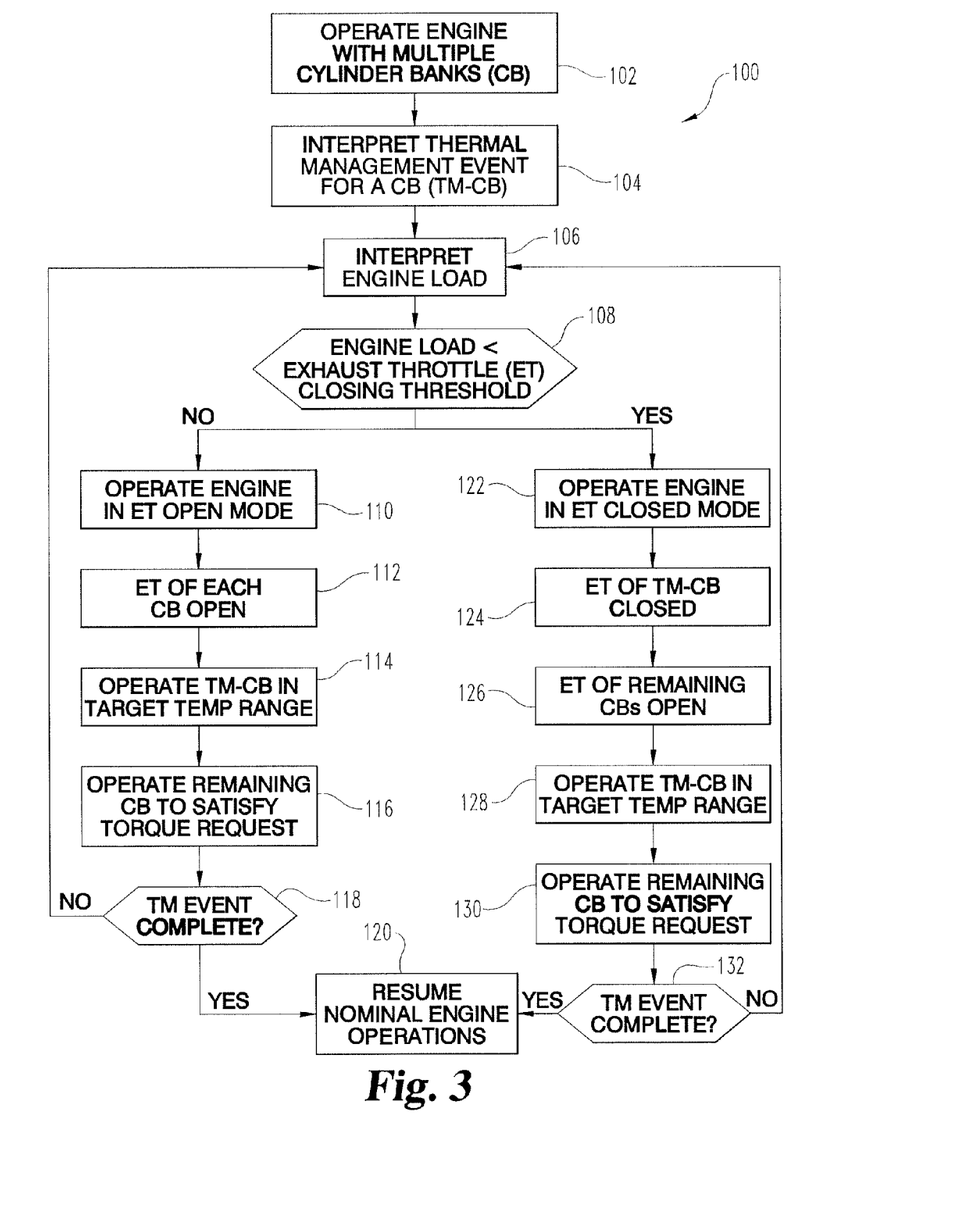
FIG. 3 is a flow diagram of a procedure for controlling fuelling operations of the cylinder banks of the internal combustion engine of FIG. 1 in response to a thermal management event with throttle open and closed modes of operation determined in response to a load on the engine.

FIG. 3 illustrates one embodiment a thermal management procedure 100 in flowchart form, which can be implemented with system 10 using appropriate operating logic executed by controller 60. Procedure 100 is directed to operating system 10 with differential fuelling to multiple cylinder banks 34a, 34b to satisfy the torque request for engine 12 while also manipulating at least one of the exhaust throttles 46a, 46b to thermally manage its associated aftertreatment system 50a, 50b to achieve or maintain a target temperature condition. As discussed above, operation of the aftertreatment systems 50a, 50b is in part temperature dependent, so that the target temperature condition may vary depending on the operating parameters of engine 12 and the desired thermal management event for operation of the aftertreatment system, such as for HC desorb, reductant deposit removal, catalyst regeneration, particulate filter regeneration, warm-up, etc. The interpretation of the thermal management event can include an associated target temperature condition for the aftertreatment system for a time period. The target temperature condition can range from, for example, 250° C. to 700° C. for a time period ranging from 10 minutes to 3 hours. The target temperature condition and time required in the target temperature condition can vary according to the type of thermal management event, the time since a previous thermal management event of the same or different type, the accumulated time and temperature of a previous thermal management event, an amount of contaminant accumulation such as reductant deposit accumulation, HC adsorption, sulfur adsorption, reduction in deNOx efficiency, catalyst deactivation, starting temperature of the aftertreatment system, or other condition.

The schematic flow diagram and related description which follows provides an illustrative embodiment of performing procedures for managing aftertreatment system temperatures while operating engine 12 to satisfy a torque request. Operations illustrated are understood to be exemplary only, and operations may be combined or divided, and added or removed, as well as re-ordered in whole or part. Certain operations illustrated may be implemented by a computer such as controller 60 executing a computer program product on a computer readable medium, where the computer program product comprises instructions causing the computer to execute one or more of the operations, or to issue commands to other devices to execute one or more of the operations.

Procedure 100 begins with operation 100 to operate engine 12 with multiple cylinder banks (CB) 34a, 34b. Procedure 100 continues at operation 104 to interpret a thermal management event (TM) for one of the cylinder banks 34a, 34b, hereinafter also referred to as the thermally managed cylinder bank TM-CB. As discussed above, a thermal management event can be any requirement for an increase in exhaust gas temperature for operation, warm-up, HC or deposit removal, or regeneration of the aftertreatment systems 50a, 50b connected to the thermally managed cylinder bank TM-CB. Procedure 100 continues from operation 104 at operation 106 to interpret a load on engine 12. The interpretation of the engine load can be made by, for example, referring to a torque map in response to an engine speed and fuelling amount to cylinders 12a-12h, by a load sensor, by a calculation in response to interpretation of one or more system operating parameters, or any other suitable technique.

From operation 106 procedure 100 continues at conditional 108 to determine if the engine load is less than an exhaust throttle closing threshold. The exhaust throttle closing threshold can be, for example, a moderate engine load, low engine load, or range of low to moderate engine loads depending on current operating conditions, such that closing of an exhaust throttle 46a, 46b will not prevent engine 12 from being operable to satisfy a current or anticipated torque request due to the closing of the exhaust throttle of the thermally managed cylinder bank TM-CB. If conditional 108 is negative, procedure 100 continues at operation 110 to operate system 10 in an exhaust throttle open mode where the exhaust throttle 46a, 46b of the thermally managed cylinder bank TM-CB is open along with the exhaust throttles 46a, 46b of the other cylinder banks. If conditional 108 is positive, procedure 100 continues at operation 122 in an exhaust throttle closed mode where at least the exhaust throttle 46a, 46b of the thermally managed cylinder bank TM-CB is closed.

From operation 110 where operation of system 10 is conducted in the exhaust throttle open mode, procedure 100 continues at operation 112 in which the exhaust throttle 46a, 46b of each cylinder bank CB is confirmed to be open or opened if necessary, including the exhaust throttle of the thermally managed cylinder bank TM-CB. Procedure 100 further includes an operation 114 to operate the thermally managed cylinder bank TM-CB in response to the target temperature condition. Operations in response to the target temperature condition includes operations to obtain and/or maintain the target temperature condition for its connected aftertreatment system 50a, 50b. Procedure 100 also include an operation 116 to operate the other cylinder bank or banks to satisfy the torque request to engine 12 by, for example, determining a differential between the torque request and the torque output of the thermally managed cylinder bank TM-CB, and determining an appropriate fuelling amount to the other cylinder bank or banks in response thereto.

Operating the thermally managed cylinder bank in response to the target temperature condition can include providing a feedforward fuelling amount that is targeted to increase the exhaust temperature and associated aftertreatment system 50a, 50b above a target temperature threshold or to a target temperature range, and can further include providing feedback control of the fuelling amount in response to a measured temperature of the exhaust gas and/or aftertreatment system of the thermally managed cylinder bank TM-CB. Operating the thermally managed cylinder bank TM-CB in response to the target temperature condition can also include increasing a speed of engine 12 to increase exhaust gas temperatures under certain operating conditions, such as when the transmission is in neutral. Other operations in response to the target temperature condition can include retarding fuel injection from fuel source 42, injecting hydrocarbons into the exhaust gas flow by post-combustion injection into the corresponding cylinders of the thermally managed cylinder bank TM-CB, or by injection of hydrocarbons from HC injector 84. The other cylinder bank or banks are simultaneously operated with a fuelling amount that satisfies the portion of the torque request to engine 12 not satisfied by operation of the thermally managed cylinder bank TM-CB in response to the target temperature condition.

While in the thermal management mode of operation, procedure 100 continues at conditional 118 to determine whether the thermal management event is complete. As used herein, a determination that the thermal management is complete includes determining of the target temperature and time in target temperature conditions are met, or a determination that operations of system 10 require ending or suspending the thermal management event for completion under more suitable operating conditions. If conditional 118 is positive, procedure 100 continues at operation 120 to resume nominal engine operations. If conditional 118 is negative, procedure 100 returns to operation 106 to interpret the engine load to determine at conditional 108 if operations should continue with the exhaust throttle of the thermally managed cylinder bank TM-CB open, or if engine load conditions require the exhaust throttle of the thermally managed cylinder bank TM-CB to be closed.

From operation 122 in which the exhaust throttle closed mode of operation is selected, procedure 100 continues at operation 124 where the exhaust throttle of the thermally managed cylinder bank TM-CB is closed and at operation 126 where the exhaust throttle of the other or remaining cylinder banks CBs are open. From operation 126 procedure 100 continues at operation 128 to operate the thermally managed cylinder bank TM-CB in response to the target temperature condition and at operation 130 to operate the other cylinder banks to satisfy the portion of the torque request to engine 12 not satisfied by the torque output of the thermally managed cylinder bank TM-CB. Operating the thermally managed cylinder bank TM-CB in response to the target temperature condition can include providing a feedforward fuelling amount that is targeted to increase or maintain the exhaust temperature and associated aftertreatment system 50a, 50b to a target temperature condition while its exhaust throttle is closed to facilitate the increase in temperature, and can further include providing feedback control of the fuelling amount to the thermally managed cylinder bank TM-CB in response to a measured temperature of the exhaust gas and/or aftertreatment system of the thermally managed cylinder bank TM-CB. In addition, other operations such as retarded injection timing, HC injection, and increasing engine speed as discussed above can be employed to achieve or maintain the target temperature condition. The other cylinder bank or remaining cylinder banks are operated with a fuelling amount that satisfies the portion of the torque request to engine 12 not satisfied by operation of the thermally managed cylinder bank TM-CB.

While in the thermal management mode, procedure 100 continues at conditional 132 to determine whether the thermal management event is complete. If conditional 132 is positive, procedure 100 continues at operation 120 to resume nominal engine operations. If conditional 132 is negative, procedure 100 returns to operation 106 to interpret the engine load to determine at conditional 108 if operations should continue with the exhaust throttle of the thermally managed cylinder bank TM-CB closed or if the engine load has increased such that the closed exhaust throttle should be opened to satisfy the torque request.

Figure 4:
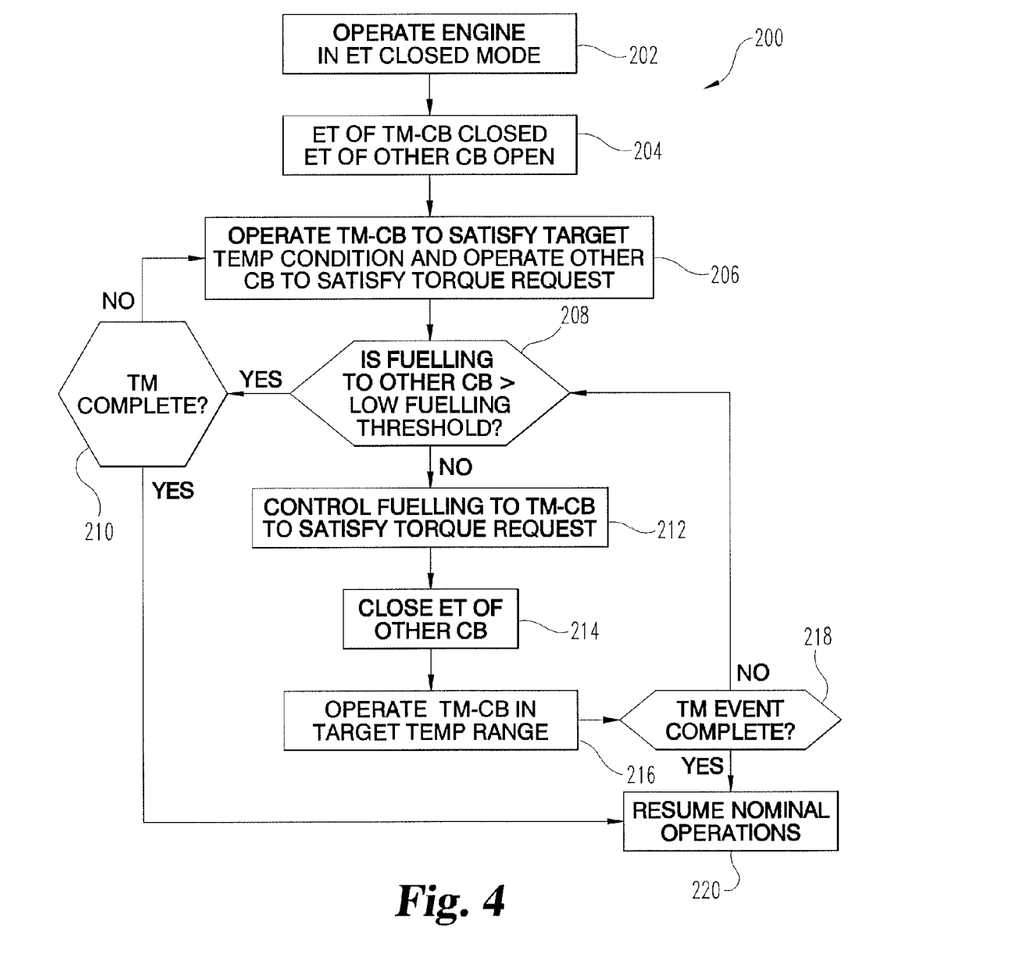
FIG. 4 is a flow diagram of an embodiment of the procedure of FIG. 3 during a throttle closed operating mode.

Referring now to FIG. 4, a further embodiment of procedure 100 during a thermal management event is shown with reference to procedure 200. Procedure 200 begins at operation 202 in which engine 12 is operated in an exhaust throttle closed mode, and at operation 204 the exhaust throttle of the thermally managed cylinder bank TM-CB is closed and the exhaust throttle of the other cylinder bank or banks are open. Procedure 200 continues at operation 206 where the thermally managed cylinder bank TM-CB is operated with a fuelling amount in response to the target temperature condition for the aftertreatment system connected thereto and the other cylinder bank or banks are operated to satisfy the torque request not satisfied by the thermally managed cylinder bank TM-CB. Procedure 200 continues at conditional 208 to determine if the fuelling requirement to the non-thermally managed cylinder bank is greater than a low fuelling threshold amount. As used herein a low fuelling amount is an amount of fuel including zero fuel, de minimus and low fuel amounts that indicate fuelling of the non-thermally managed cylinder bank with its exhaust throttle open is not required to satisfy the engine torque request. If conditional 208 is positive, procedure 200 continues at conditional 210 to determine if the thermal management is complete. If conditional 210 is positive, procedure 200 continues at operation 220 where nominal engine operations are resumed. If conditional 210 is negative, procedure 200 returns to operation 206.

If conditional 208 is negative in response to the fuelling amount to the non-thermally managed cylinder bank being below a low fuelling threshold amount, procedure 200 continues at operation 212 to limit the fuelling amount to the thermally managed cylinder bank TM-CB to satisfy the torque request, and then at operation 214 to close the exhaust throttle of the other cylinder bank. With both exhaust throttles closed, procedure 200 then continues at operation 216 operate the thermally managed cylinder bank TM-CB in response to the target temperature condition. The other cylinder bank can then be fuelled with a third fuelling amount as determined to be needed to satisfy the portion of the torque request not satisfied by the thermally managed cylinder bank TM-CB. In another embodiment, procedure 200 determines that fuelling to the non-thermally managed cylinder bank is below a low fuelling threshold amount in conjunction with interpreting the thermal management event closes both exhaust throttles at the start of the thermal management event. Procedure 200 continues at conditional 218 to determine if the thermal management is complete. If conditional 210 is positive, procedure 200 continues at operation 220 where nominal engine operations are resumed. If conditional 210 is negative, procedure 200 returns to conditional 208 as discussed above.

Several aspects and embodiments of the present disclosure are envisioned. For example, in aspect, a method includes operating an internal combustion engine system including an engine with first and second cylinder banks each including at least one cylinder for receiving fuel from a fuel system, an intake system for delivering air to each of the cylinders, and an exhaust system including a first aftertreatment system for receiving exhaust gases from the first cylinder bank and a second aftertreatment system for receiving exhaust gases from the second cylinder bank, a first throttle connected to the first cylinder bank, and a second throttle connected to the second cylinder bank. The method further includes interpreting a thermal management event for the first aftertreatment system; in response to the thermal management event, determining a first fuelling amount to the first cylinder bank that produces an exhaust gas from the first cylinder bank in response to a target temperature condition for the first aftertreatment system; determining a second fuelling amount to the second cylinder bank that satisfies a differential between a torque request to the engine and a torque output by the first cylinder bank in response to the first fuelling amount; and operating the engine with the first cylinder bank fuelled with the first fuelling amount and the second cylinder bank fuelled with the second fuelling amount.

In one embodiment, the method includes, before determining the first fuelling amount and the second fuelling amount, interpreting a load condition of the engine and closing the first throttle in response to the load condition being less than a throttle closing threshold in conjunction with interpreting the thermal management event. In a refinement of this embodiment, the method further includes maintaining the second throttle open while operating the engine with the first fuelling amount and the second fuelling amount. In another refinement, the method includes closing the second throttle when the second fuelling amount is below a low fuelling threshold amount.

In an embodiment of the method, the thermal management event includes a regeneration requirement for at least one component of the aftertreatment system. In another embodiment, the thermal management event includes an exhaust gas temperature increase requirement for operational efficiency of at least one component of the aftertreatment system.

In yet another embodiment, the method includes operating the engine with the first cylinder bank fuelled with the first fuelling amount and the second cylinder bank fuelled with the second fuelling amount while each of the first and second throttles is opened. In one embodiment, the method includes determining the thermal management event is complete and resuming nominal engine operations after the thermal management is complete. In a further embodiment, the method includes increasing a speed of the engine in response to the target temperature condition. In still another embodiment, the method includes at least one of retarding an injection timing of fuel into the at least one cylinder of the first cylinder bank and injecting hydrocarbons into the exhaust gas flow from the first cylinder bank in response to the target temperature condition.

In one embodiment of the method, in the first throttle and the second throttle are each exhaust throttles. In a refinement of this embodiment, the first throttle upstream is upstream of the first aftertreatment system and the second throttle is upstream of the second aftertreatment system. In another embodiment, the first throttle and the second throttle are each intake throttles.

According to another aspect, a method includes producing a first exhaust gas flow from a first cylinder bank of an engine to a first aftertreatment system; producing a second exhaust gas flow from a second cylinder bank of the engine to a second aftertreatment system; interpreting a thermal management event for the first aftertreatment system; determining a load on the engine is less than an exhaust throttle closing threshold; closing a first exhaust throttle between the first cylinder bank and the first aftertreatment system in response to determining the load on the engine is less than the exhaust throttle closing threshold; determining a first fuelling amount to the first cylinder bank in response to a target temperature condition associated with the thermal management event; determining a second fuelling amount to the second cylinder bank that satisfies a differential between a torque request to the engine and a torque output by the first cylinder bank in response to the first fuelling amount; and operating the engine with the first cylinder bank fuelled with the first fuelling amount and the second cylinder bank fuelled with the second fuelling amount.

In one embodiment, the method includes closing a second exhaust throttle between the second cylinder bank and the second aftertreatment system in response to the second fuelling amount being below a low fuelling threshold amount. In a refinement of this embodiment, after determining the second fuelling amount to be below the low fuelling threshold amount, limiting the first fuelling amount to the first cylinder bank in response to the torque request. In a further refinement, the method includes determining a third fuelling amount to the second cylinder bank after closing the second exhaust throttle that satisfies a differential between the torque request to the engine and the torque output by the first cylinder bank in response to the first fuelling amount and fuelling the second cylinder bank with the third fuelling amount.

In still another aspect, an internal combustion engine system includes an engine with a plurality of cylinders that define at least a first cylinder bank and a second cylinder bank each configured to produce an output torque. The system includes a fuel system configured to differentially fuel the first cylinder bank and the second cylinder bank, an intake system configured to provide air flow to the plurality of cylinders, and an exhaust system including a first exhaust flow path connected to the first cylinder bank to receive a first exhaust flow from the first cylinder bank and a second exhaust flow path connected to the second cylinder bank to receive a second exhaust flow from the second cylinder bank. The first exhaust flow path includes a first aftertreatment system, and the second exhaust flow path includes a second aftertreatment system. The system also includes a first throttle associated with the first cylinder bank and a second throttle associated with the second cylinder bank, and first and second sensors each operable to provide a signal indicative of a thermal management event for a respective one of the first and second aftertreatment systems and a controller coupled to each of the first and second sensors, the fuel system, the first and second throttles, and the engine. The controller is operable in response to the signal indicating the thermal management event for the respective one of the first and second aftertreatment systems to control the fuel system to fuel the corresponding one of the first and second cylinder banks connected thereto in response to a target temperature condition for the thermal management event while controlling the fuel system to fuel the other of the first and second cylinder banks to satisfy a portion of a torque request to the engine not satisfied by the torque output of the cylinder bank fuelled in response to the target temperature condition.

In one embodiment of the system, the controller is further configured to close a respective one of the first and second throttles associated with the aftertreatment system for which thermal management is indicated in response to a load on the engine being less than an throttle closing threshold. In a refinement of this embodiment, the controller is further configured to close the other of the first and second throttles in response to a low fuelling amount being required to satisfy the portion of the torque request not satisfied by the cylinder bank fuelled in response to the target temperature condition. In a further refinement, each of the throttles is an exhaust throttle upstream of the aftertreatment system of the associated aftertreatment system.

In another embodiment of the system, the controller is further configured to close each of the first and second throttles in response to a low fuelling amount required to satisfy the portion of the torque request not satisfied by the cylinder bank fuelled in response to the target temperature condition.

In a further embodiment of the system, each of the first and second throttles is an on-off type valve. In a refinement of this embodiment, each of the throttles is an exhaust throttle and when in a closed position each of the first and second exhaust throttles is configured to permit an exhaust flow therethrough that is less than the exhaust flow produced by the respective cylinder bank.

In another embodiment of the system, the first exhaust flow path includes a first turbine for receiving the exhaust flow from the first cylinder bank and the second exhaust flow path includes a second turbine for receiving the exhaust flow from the second cylinder bank. In a refinement of this embodiment, the first throttle is a first exhaust throttle upstream of the first turbine in the first exhaust flow path and the second throttle is a second exhaust throttle upstream of the second turbine in the second exhaust flow path. In another refinement, the first exhaust throttle is downstream of the first turbine in the first exhaust flow path and the second exhaust throttle is downstream of the second turbine in the second exhaust flow path. In yet another embodiment of the system, the first exhaust flow path includes at least two turbines for receiving the exhaust flow from the first cylinder bank and the first throttle is between the at least two turbines of the first exhaust flow path. The second exhaust flow path also includes at least two turbines for receiving the exhaust flow from the second cylinder bank and the second throttle is between the at least two turbines of the second exhaust flow path.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:
1. A method, comprising:
 operating an internal combustion engine system including an engine with first and second cylinder banks each including at least one cylinder for receiving fuel from a fuel system, an intake system for delivering air to each of the cylinders, and an exhaust system including a first aftertreatment system for receiving exhaust gases from the first cylinder bank and a second aftertreatment system for receiving exhaust gases from the second cylinder bank, and further comprising a first throttle connected to the first cylinder bank and a second throttle connected to the second cylinder bank;
interpreting a thermal management event for the first aftertreatment system;
in response to the thermal management event, determining a first fuelling amount to the first cylinder bank that produces an exhaust gas from the first cylinder bank in response to a target temperature condition for the first aftertreatment system;
determining a second fuelling amount to the second cylinder bank that satisfies a differential between a torque request to the engine and a torque output by the first cylinder bank in response to the first fuelling amount; and
operating the engine with the first cylinder bank fuelled with the first fuelling amount and the second cylinder bank fuelled with the second fuelling amount.

2. The method of claim 1, further comprising, before determining the first fuelling amount and the second fuelling amount, interpreting a load condition of the engine and closing the first throttle in response to the load condition being less than a throttle closing threshold in conjunction with interpreting the thermal management event.

3. The method of claim 2, further comprising maintaining the second throttle open while operating the engine with the first fuelling amount and the second fuelling amount.

4. The method of claim 2, further comprising closing the second throttle when the second fuelling amount is below a low fuelling amount threshold.

5. The method of claim 1, wherein the thermal management event includes a regeneration requirement for at least one component of the aftertreatment system.

6. The method of claim 1, wherein the thermal management event includes an exhaust gas temperature increase requirement for operational efficiency of at least one component of the aftertreatment system.

7. The method of claim 1, further comprising operating the engine with the first cylinder bank fuelled with the first fuelling amount and the second cylinder bank fuelled with the second fuelling amount while each of the first and second throttles is opened.

8. The method of claim 1, further comprising determining the thermal management event is complete and resuming nominal engine operations after the thermal management is complete.

9. The method of claim 1, further comprising increasing a speed of the engine in response to the target temperature condition.

10. The method of claim 1, further comprising at least one of retarding an injection timing of fuel into the at least one cylinder of the first cylinder bank and injecting hydrocarbons into the exhaust gas flow from the first cylinder bank in response to the target temperature condition.

11. The method of claim 1, wherein the first throttle and the second throttle are each exhaust throttles.

12. The method of claim 11, wherein the first throttle upstream is upstream of the first aftertreatment system and the second throttle is upstream of the second aftertreatment system.

13. The method of claim 1, wherein the first throttle and the second throttle are each intake throttles.

14. A method, comprising:
producing a first exhaust gas flow from a first cylinder bank of an engine to a first aftertreatment system;
producing a second exhaust gas flow from a second cylinder bank of the engine to a second aftertreatment system;
interpreting a thermal management event for the first aftertreatment system;
determining a load on the engine is less than an exhaust throttle closing threshold;
closing a first exhaust throttle between the first cylinder bank and the first aftertreatment system in response to determining the load on the engine is less than the exhaust throttle closing threshold;
determining a first fuelling amount to the first cylinder bank in response to a target temperature condition associated with the thermal management event;
determining a second fuelling amount to the second cylinder bank that satisfies a differential between a torque request to the engine and a torque output by the first cylinder bank in response to the first fuelling amount; and
operating the engine with the first cylinder bank fuelled with the first fuelling amount and the second cylinder bank fuelled with the second fuelling amount.

15. The method of claim 14, further comprising closing a second exhaust throttle between the second cylinder bank and the second aftertreatment system in response to the second fuelling amount being below a low fuelling threshold.

16. The method of claim 15, further comprising, after determining the second fuelling amount to be below the low fuelling threshold, limiting the first fuelling amount to the first cylinder bank in response to the torque request.

17. The method of claim 16, further comprising determining a third fuelling amount to the second cylinder bank after closing the second exhaust throttle that satisfies a differential between the torque request to the engine and the torque output by the first cylinder bank in response to the first fuelling amount and fuelling the second cylinder bank with the third fuelling amount.

18. An internal combustion engine system, comprising:
an engine with a plurality of cylinders, the plurality of cylinders defining at least a first cylinder bank and a second cylinder bank each configured to produce an output torque;
a fuel system configured to differentially fuel the first cylinder bank and the second cylinder bank;
an intake system configured to provide air flow to the plurality of cylinders;
an exhaust system including a first exhaust flow path connected to the first cylinder bank to receive a first exhaust flow from the first cylinder bank and a second exhaust flow path connected to the second cylinder bank to receive a second exhaust flow from the second cylinder bank, the first exhaust flow path including a first aftertreatment system and the second exhaust flow path including a second aftertreatment system;
a first throttle associated with the first cylinder bank and a second throttle associated with the second cylinder bank;
first and second sensors each operable to provide a signal indicative of a thermal management event for a respective one of the first and second aftertreatment systems; and
a controller coupled to each of the first and second sensors, the fuel system, the first and second throttles, and the engine, the controller being operable in response to the signal indicating the thermal management event for the respective one of the first and second aftertreatment systems to control the fuel system to fuel the corresponding one of the first and second cylinder banks connected thereto in response to a target temperature condition for the thermal management event while controlling the fuel system to fuel the other of the first and second cylinder banks to satisfy a portion of a torque request to the engine not satisfied by the torque output of the cylinder bank fuelled in response to the target temperature condition.

19. The system of claim 18, wherein the first throttle is a first exhaust throttle upstream of the first aftertreatment system, and the second throttle is a second exhaust throttle upstream of the second aftertreatment system.

20. The system of claim 19, wherein the controller is further configured to close a respective one of the first and second exhaust throttles upstream of the aftertreatment system for which thermal management is indicated in response to a load on the engine being less than an exhaust throttle closing threshold.

21. The system of claim 20, wherein the controller is further configured to close the other of the first and second exhaust throttles in response to a fuelling amount being required to satisfy the portion of the torque request not satisfied by the cylinder bank fuelled in response to the target temperature condition being below a low fuelling threshold.

22. The system of claim 18, wherein the controller is further configured to close each of the first and second throttles in response to a fuelling amount required to satisfy the portion of the torque request not satisfied by the cylinder bank fuelled in response to the target temperature condition being below a low fuelling threshold.

23. The system of claim 18, wherein each of the first and second throttles is an on-off type valve.

24. The system of claim 23, wherein each of the first and second throttles is an exhaust throttle and in a closed position each of the first and second exhaust throttles is configured to permit an exhaust flow therethrough that is less than the exhaust flow produced by the respective cylinder bank.

25. The system of claim 18, wherein the first exhaust flow path includes a first turbine for receiving the exhaust flow from the first cylinder bank and the second exhaust flow path includes a second turbine for receiving the exhaust flow from the second cylinder bank.

26. The system of claim 25, wherein the first throttle is upstream of the first turbine in the first exhaust flow path and the second throttle is upstream of the second turbine in the second exhaust flow path.

27. The system of claim 25, wherein the first throttle is downstream of the first turbine in the first exhaust flow path and the second throttle is downstream of the second turbine in the second exhaust flow path.

28. The system of claim 18, wherein:
the first exhaust flow path includes at least two turbines for receiving the exhaust flow from the first cylinder bank and the first throttle is between the at least two turbines of the first exhaust flow path; and
the second exhaust flow path includes at least two turbines for receiving the exhaust flow from the second cylinder bank and the second throttle is between the at least two turbines of the second exhaust flow path.

* * * * *